US009205820B2

(12) United States Patent
Briesewitz et al.

(10) Patent No.: US 9,205,820 B2
(45) Date of Patent: Dec. 8, 2015

(54) PULSATION DAMPENING CAPSULE

(75) Inventors: Rudiger Briesewitz, Bruchkobel (DE); Dieter Dinkel, Schwalbach (DE); Christoph Wagner, Bad Nauhei (DE); Hans-Jorg Feigel, Rosbach (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 346 days.

(21) Appl. No.: 13/636,093

(22) PCT Filed: Mar. 16, 2011

(86) PCT No.: PCT/EP2011/053971
§ 371 (c)(1),
(2), (4) Date: Sep. 19, 2012

(87) PCT Pub. No.: WO2011/117128
PCT Pub. Date: Sep. 29, 2011

(65) Prior Publication Data
US 2013/0008544 A1 Jan. 10, 2013

(30) Foreign Application Priority Data
Mar. 23, 2010 (DE) .......................... 10 2010 003 132

(51) Int. Cl.
*F16L 55/04* (2006.01)
*B60T 8/40* (2006.01)
(52) U.S. Cl.
CPC .................................... *B60T 8/4068* (2013.01)
(58) Field of Classification Search
CPC .............. B60T 8/4068; F16D 65/0006; F16D 2125/06; F16L 55/05

USPC ..................... 138/30, 26; 188/73.37; 417/540
See application file for complete search history.

(56) References Cited

U.S. PATENT DOCUMENTS 5,054,373 A * 10/1991 Brault et al. .................... 92/921
5,215,124 A * 6/1993 Hattori et al. .................... 138/30

(Continued)

FOREIGN PATENT DOCUMENTS

DE 10 2008 035 943 A1 3/2009
DE 10 2008 047 303 A1 8/2009

(Continued)

OTHER PUBLICATIONS

German Examination Report—Oct. 8, 2010.
PCT International Search Report—May 17, 2011.

*Primary Examiner* — Donnell Long
(74) *Attorney, Agent, or Firm* — Brinks Gilson & Lione

(57) ABSTRACT

A pulsation damping capsule for connection to the pressure side of a piston pump having a metal membrane housing that is assembled from two membrane shells joined together in a hermetically sealed manner. The metal membrane housing separates an internal space from a surrounding pressure medium. The membrane shells are connected along a circumferential seam such that the pulsation damping capsule can compress and expand in a resilient-elastic manner as an energy convertor when subjected to external pressure as a result of pressure medium pulses. A reshapeable mass is arranged in the internal space and when the membrane shells are in the resilient-elastically compressed state, the mass completely fills an intermediate space that remains between the two membrane shells, so that the mass is precisely matched to the internal contour of the reshaped membrane shells while avoiding the formation of hollow spaces.

10 Claims, 1 Drawing Sheet

(56) References Cited

U.S. PATENT DOCUMENTS

| | | | |
|---|---|---|---|
| 5,409,041 A * | 4/1995 | Yoshida et al. | 138/30 |
| 5,718,952 A * | 2/1998 | Zimmermann et al. | 428/34.1 |
| 5,904,181 A * | 5/1999 | Tooma et al. | 138/30 |
| 7,621,296 B2 * | 11/2009 | Freissler et al. | 138/30 |
| 8,757,212 B2 * | 6/2014 | Bartsch et al. | 138/30 |
| 2002/0053364 A1 * | 5/2002 | Kobayashi et al. | 138/30 |
| 2003/0159743 A1 * | 8/2003 | Kobayashi et al. | 138/30 |
| 2008/0210324 A1 * | 9/2008 | Hasunuma | 138/30 |

FOREIGN PATENT DOCUMENTS

| | | |
|---|---|---|
| EP | 1 002 984 A2 | 5/2000 |
| EP | WO 01/76926 A1 | 10/2001 |
| EP | WO 2009/103709 A1 | 8/2009 |
| JP | 8-14527 | 6/1996 |
| WO | WO 0176926 A1 * | 10/2001 |

* cited by examiner

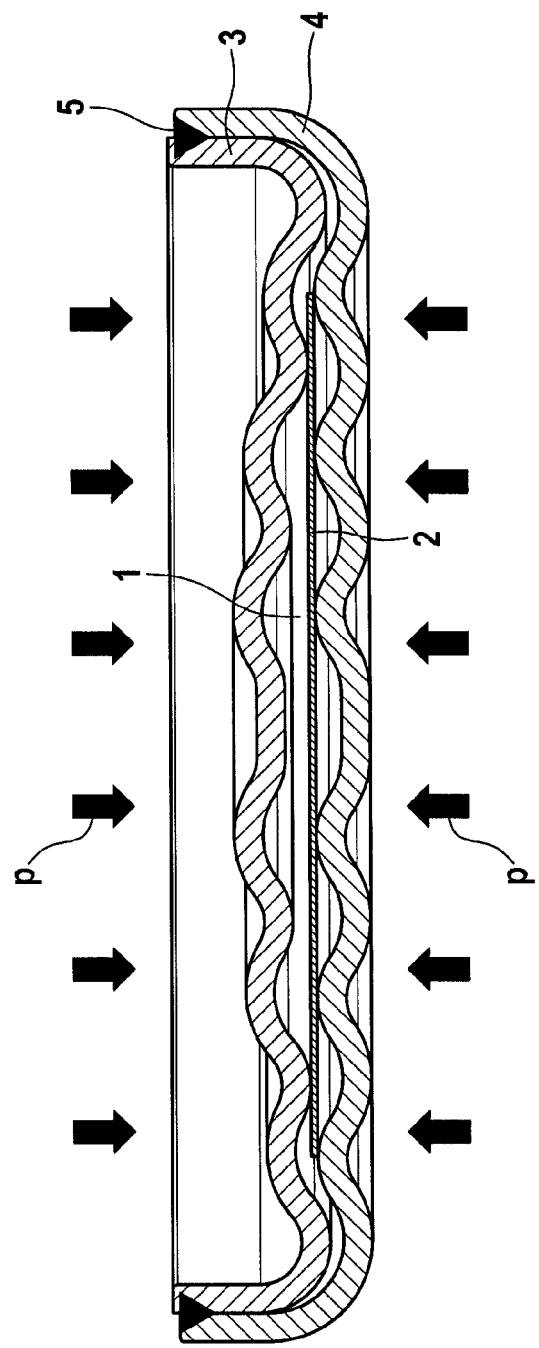

PULSATION DAMPENING CAPSULE

CROSS-REFERENCE TO RELATED APPLICATIONS

This application claims priority to German Patent Application No. 10 2010 003 132.123, filed Mar. 23, 2010 and PCT/EP2011/053971, filed Mar. 16, 2011.

FIELD OF THE INVENTION

The invention relates to a pulsation damping capsule, in particular for connecting to the pressure side of a piston pump according.

A pulsation damping capsule of the above-referenced general type is already known from WO2009/103709A1, which pulsation damping capsule is connected to the pressure side of a piston pump in order to dampen pressure pulses produced by the piston pump. The known pulsation damping capsule comprises at least one metal membrane housing that is assembled from two membrane shells that are joined together in a hermetically sealed manner and the metal membrane housing separates an internal space from the pressure medium that is conveyed by the piston pump, wherein the membrane shells are mutually connected by means of material engagement along a circumferential seam in such a manner that the pulsation damping capsule can compress and expand in a resilient-elastic manner as an energy convertor when subjected to external pressure.

In the ideal state, the two membrane shells nestle perfectly one against the other when subjected to pressure, so that there is no space remaining between the two. In this ideal state, the mechanical stresses do not increase in the reshaped membrane shells. However, since the membrane shells are encumbered by tolerances, the ideal state is generally not achievable. As a result, a space remains between the two membrane shells, so that, when the membrane shells are subjected to accordingly high pressure, locally inadmissible stress peaks occur in the membrane shells as a result of the intermediate space and said inadmissible stress peaks are to be avoided.

The object of the present invention is therefore to improve a pulsation damping capsule of the type mentioned in such a manner that in a cost-effective manner inadmissible stress peaks in the membrane shells are avoided.

This object is achieved in accordance with the invention for a pulsation damping capsule of the type described herein.

BRIEF DESCRIPTION OF THE DRAWING

Further features and advantages of the invention are disclosed hereinunder in the description of an exemplary embodiment with the aid of a drawing.

FIG. 1 illustrates a longitudinal sectional view through a pulsation damping capsule in accordance with this invention.

DETAILED DESCRIPTION OF THE INVENTION

FIG. 1 illustrates a longitudinal sectional view through a pulsation damping capsule 10 that is provided with the features essential to the invention, said pulsation damping capsule having at least one metal membrane housing that is assembled from two membrane shells 3, 4 that are joined together in a sealed manner (which may be hermetically sealed), said metal membrane housing having an evacuated internal space 1 that is separate from the pressure medium that is discontinuously conveyed by a piston pump, wherein the membrane shells 3, 4 are mutually connected by means of material engagement along a circumferential seam 5 in such a manner that the pulsation damping capsule that is fixed in a pressure duct can compress and expand in a resilient-elastic manner as an energy convertor when subjected to an external pressure with the hydraulic pressure p.

The invention is characterized by the fact that when the membrane shells 3, 4 are in the resilient-elastically compressed state a reshapeable mass 2 is arranged in the internal space 1, which reshapeable mass completely fills an intermediate space 1 that remains between the two membrane shells 3, 4, for which purpose the mass 2 is precisely matched to the inner contour of the reshaped membrane shells 3, 4 whilst avoiding the formation of hollow spaces.

The internal space 1 comprises a useable volume that is necessary for the energy conversion and an additional volume that is necessary for receiving the mass 2 in the internal space 1. The reshapeable mass 2 comprises a high level of thermal and chemical stability in order to ensure that, when the two membrane shells 3, 4 are subjected to pressure, the mass 2 is precisely matched to the surface contour of the membrane shells 3, 4. Consequently, as the two membrane shells 3, 4 are compressed, a fit tolerance of the two membrane shells 3, 4 that undesirably occurs as the two membrane shells 3, 4 are elastically reshaped is completely compensated for by the mass 2 that is arranged between the membrane shells 3, 4.

In the exemplary embodiment as shown in FIG. 1, the mass 2 is inserted in the form of a film as an insertion part into the internal space 1 of the two membrane shells 3, 4 prior to the two membrane shells 3, 4 being joined together and mutually connected by material engagement. The film is preferably produced from polytetrafluoroethylene, as a result of which the requirements mentioned in the introduction with respect to the best possible matching of the mass 2 to the contour of the membrane shells and also with respect to the load-receiving capacity of the mass 2 are fulfilled.

As an alternative to the exemplary embodiment illustrated, it is proposed that the mass 2 is inserted in the form of a semi-hydraulic cushion, preferably comprising a gel, into the internal space 1 between the two membrane shells 3, 4, prior to the two membrane shells 3, 4 being joined together and mutually connected by material engagement, as a result of which the fit tolerances are compensated for and consequently an undesired intermediate space between the two membrane shells 3, 4 is achieved in a satisfactory manner.

A further expedient embodiment of the mass 2 is produced by using a granulate that is inserted into the internal space 1 as desired or required also as a soft blank in tablet form prior to the two membrane shells 3, 4 being joined together and mutually connected by material engagement, wherein the granulate when subjected to pressure demonstrates the desired semi-hydraulic properties.

By arranging the described mass 2 between the corrugated membrane shells 3, 4, not only is the loading on the membrane shells 3, 4 reduced but in addition large manufacturing tolerances can be accepted, so that the manufacturing costs for the pulsation damping capsule are reduced whilst simultaneously increasing the functional reliability. A further advantage resides in the fact that it is not necessary to make any cost-intensive changes to the existing manufacturing process of the pulsation damping capsule. The manufacturing process comprises unchanged the steps of press shaping the metallic membrane shells 3, 4, joining together and welding or, if necessary, as an alternative soldering the membrane shells 3, 4 along the circumferential seam 5, with the small but particularly efficient special feature that the reshapeable mass 2 is to be taken into account in the internal space 1 prior to the two membrane shells 3, 4 being mutually connected by material engagement.

While the above description constitutes the preferred embodiment of the present invention, it will be appreciated that the invention is susceptible to modification, variation, and change without departing from the proper scope and fair meaning of the accompanying claims.

The invention claimed is:

1. A pulsation damping capsule for connection to the pressure side of a piston pump, comprising at least one metal membrane housing that is assembled from two membrane shells that are joined together in a sealed manner and the metal membrane housing separates an internal space from a surrounding pressure medium, wherein the membrane shells are mutually connected along a circumferential seam in such a manner that the pulsation damping capsule can compress and expand in a resilient-elastic manner as an energy converter when subjected to external pressure as a result of pressure medium pulses, a reshapeable mass is arranged in the internal space and when the membrane shells are in a resilient-elastically compressed state the mass completely fills the internal space that remains between the two membrane shells, so that the mass is precisely matched to the internal contour of the membrane shells while avoiding the formation of hollow spaces in the internal space;
wherein the mass is inserted in the form of a film as an insertion part into the internal space of the two membrane shells prior to the two membrane shells being joined together and mutually connected by material engagement.

2. The pulsation damping capsule as claimed in claim 1, further comprising that the internal space comprises a useable volume that is necessary for the energy conversion and an additional volume that is necessary for receiving the mass in the internal space.

3. The pulsation damping capsule as claimed in claim 1 further comprising that the mass comprises a material having a high level of thermal and chemical stability.

4. The pulsation damping capsule as claimed in claim 1 further comprising in that as the two membrane shells are compressed, a fit tolerance of the two membrane shells that occurs as the two membrane shells are elastically reshaped is compensated for by the mass that is arranged between the membrane shells.

5. The pulsation damping capsule as claimed in claim 1, wherein the film is produced from polytetrafluoroethylene.

6. A pulsation damping capsule for connection to the pressure side of a piston pump, comprising at least one metal membrane housing that is assembled from two membrane shells that are joined together in a sealed manner and the metal membrane housing separates an internal space from a surrounding pressure medium, wherein the membrane shells are mutually connected along a circumferential seam in such a manner that the pulsation damping capsule can compress and expand in a resilient-elastic manner as an energy converter when subjected to external pressure as a result of pressure medium pulses, a reshapeable mass is arranged in the internal space and when the membrane shells are in a resilient-elastically compressed state the mass completely fills the internal space that remains between the two membrane shells, so that the mass is precisely matched to the internal contour of the membrane shells while avoiding the formation of hollow spaces in the internal space
wherein the mass is inserted in the form of a semi-hydraulic cushion gel, into the internal space of the two membrane shells prior to the two membrane shells being joined together and mutually connected by material engagement.

7. The pulsation damping capsule as claimed in claim 6, wherein the membrane shells are arranged such that a first membrane shell of the membrane shells is nested within a second membrane shell of the membrane shells, such that an outer profile of the first membrane shell faces an inner profile of the second membrane shell.

8. A pulsation damping capsule for connection to the pressure side of a piston pump, comprising at least one metal membrane housing that is assembled from two membrane shells that are joined together in a sealed manner and the metal membrane housing separates an internal space from a surrounding pressure medium, wherein the membrane shells are mutually connected along a circumferential seam in such a manner that the pulsation damping capsule can compress and expand in a resilient-elastic manner as an energy converter when subjected to external pressure as a result of pressure medium pulses, a reshapeable mass is arranged in the internal space and when the membrane shells are in a resilient-elastically compressed state the mass completely fills the internal space that remains between the two membrane shells, so that the mass is precisely matched to the internal contour of the membrane shells while avoiding the formation of hollow spaces in the internal space
wherein the mass is inserted in the form of a granulate into the internal space of the two membrane shells prior to the two membrane shells being joined together and mutually connected by material engagement.

9. The pulsation damping capsule as claimed in claim 8, further comprising in that the granulate is inserted as a soft blank in the form of a tablet.

10. The pulsation damping capsule as claimed in claim 8, wherein the membrane shells are arranged such that a first membrane shell of the membrane shells is nested within a second membrane shell of the membrane shells, such that an outer profile of the first membrane shell faces an inner profile of the second membrane shell.

* * * * *